United States Patent
Toth

(10) Patent No.: US 10,240,678 B2
(45) Date of Patent: Mar. 26, 2019

(54) RADIAL SHAFT SEAL ASSEMBLY WITH AXIALLY ADAPTIVE DEBRIS EXCLUSION FACE LIP AND OIL SEAL FACE LIP

(71) Applicant: Federal-Mogul Corporation, Southfield, MI (US)

(72) Inventor: David M. Toth, Brighton, MI (US)

(73) Assignee: Tenneco Inc., Lake Forest, IL (US)

( * ) Notice: Subject to any disclaimer, the term of this patent is extended or adjusted under 35 U.S.C. 154(b) by 120 days.

(21) Appl. No.: 15/296,587

(22) Filed: Oct. 18, 2016

(65) Prior Publication Data

US 2018/0106373 A1 Apr. 19, 2018

(51) Int. Cl.
| | |
|---|---|
| F16J 15/32 | (2016.01) |
| F16J 15/3232 | (2016.01) |
| F16J 15/3224 | (2016.01) |
| F16J 15/3284 | (2016.01) |
| F16J 15/3256 | (2016.01) |

(52) U.S. Cl.
CPC ....... *F16J 15/3232* (2013.01); *F16J 15/3224* (2013.01); *F16J 15/3256* (2013.01); *F16J 15/3284* (2013.01)

(58) Field of Classification Search
CPC ........ F16J 15/32; F16J 15/3216; F16J 15/322; F16J 15/3232; F16J 15/3224; F16J 15/3284
See application file for complete search history.

(56) References Cited

U.S. PATENT DOCUMENTS

| | | | |
|---|---|---|---|
| 2,781,208 A | 2/1957 | Foss | |
| 2,881,015 A | 4/1959 | Wahl | |
| 3,099,454 A * | 7/1963 | Walinski | F16J 15/3208 277/565 |

(Continued)

FOREIGN PATENT DOCUMENTS

| | | |
|---|---|---|
| DE | 3739513 A1 | 6/1989 |
| DE | 102011114349 A1 | 4/2012 |

(Continued)

OTHER PUBLICATIONS

International Search Report, dated Jan. 31, 2018 (PCT/US2017/057088).

*Primary Examiner* — Gilbert Y Lee
(74) *Attorney, Agent, or Firm* — Robert L. Stearns; Dickinson Wright, PLLC

(57) ABSTRACT

A radial shaft seal assembly is provided including an inner wear sleeve having a cylindrical wall with a bore sized for tight receipt of a shaft therethrough and an exposed cylindrical outer surface. The inner wear sleeve includes an oil side flange and an air side flange extending radially outwardly from the inner wall in axially spaced relation from one another. The assembly includes an outer case having cylindrical outer wall configured for receipt in a housing. An elastomeric body is fixed to the outer case. The elastomeric body includes an annular serpentine portion extending radially inwardly from the outer wall to a radially innermost end. A main seal lip extends from the innermost end of the annular serpentine portion into sealed contact with the oil side flange. A dust lip extends from the innermost end of the annular serpentine portion into sealed contact with the air side flange.

28 Claims, 7 Drawing Sheets

(56) References Cited

U.S. PATENT DOCUMENTS

| | | | | |
|---|---|---|---|---|
| 3,682,488 | A | * 8/1972 | Matsushima | F16J 15/3256 277/551 |
| 4,844,484 | A | 7/1989 | Antonini et al. | |
| 4,856,794 | A | * 8/1989 | Boyers | F16J 15/3268 277/565 |
| 5,348,312 | A | * 9/1994 | Johnston | F16J 15/3256 277/375 |
| 5,687,972 | A | 11/1997 | Petrak | |
| 6,273,428 | B1 | * 8/2001 | Sassi | F16J 15/3256 277/348 |
| 7,464,939 | B2 | 12/2008 | Matsui | |
| 7,677,577 | B2 | 3/2010 | Kanzaki et al. | |
| 7,959,157 | B2 | 6/2011 | Dobbs et al. | |
| 8,480,092 | B2 | 7/2013 | Hatch | |
| 2008/0029967 | A1 | 2/2008 | Nakagawa et al. | |
| 2014/0062027 | A1 | 3/2014 | Neuberger et al. | |
| 2015/0219218 | A1 | 8/2015 | Berdichevsky et al. | |
| 2015/0219219 | A1 | 8/2015 | Fei et al. | |
| 2015/0276059 | A1 | 10/2015 | Nakagawa | |
| 2016/0069457 | A1 | 3/2016 | Neuberger et al. | |

FOREIGN PATENT DOCUMENTS

| | | |
|---|---|---|
| EP | 0525288 A1 | 2/1993 |
| EP | 1628052 A2 | 2/2006 |

* cited by examiner

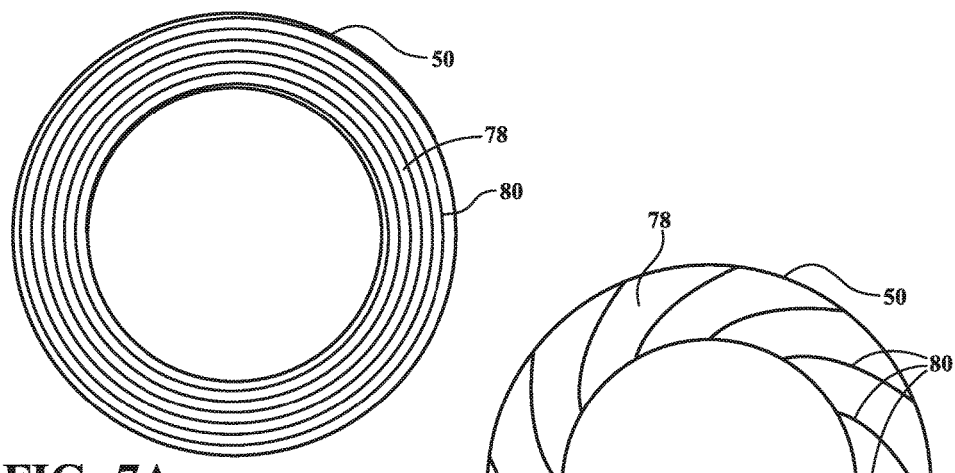
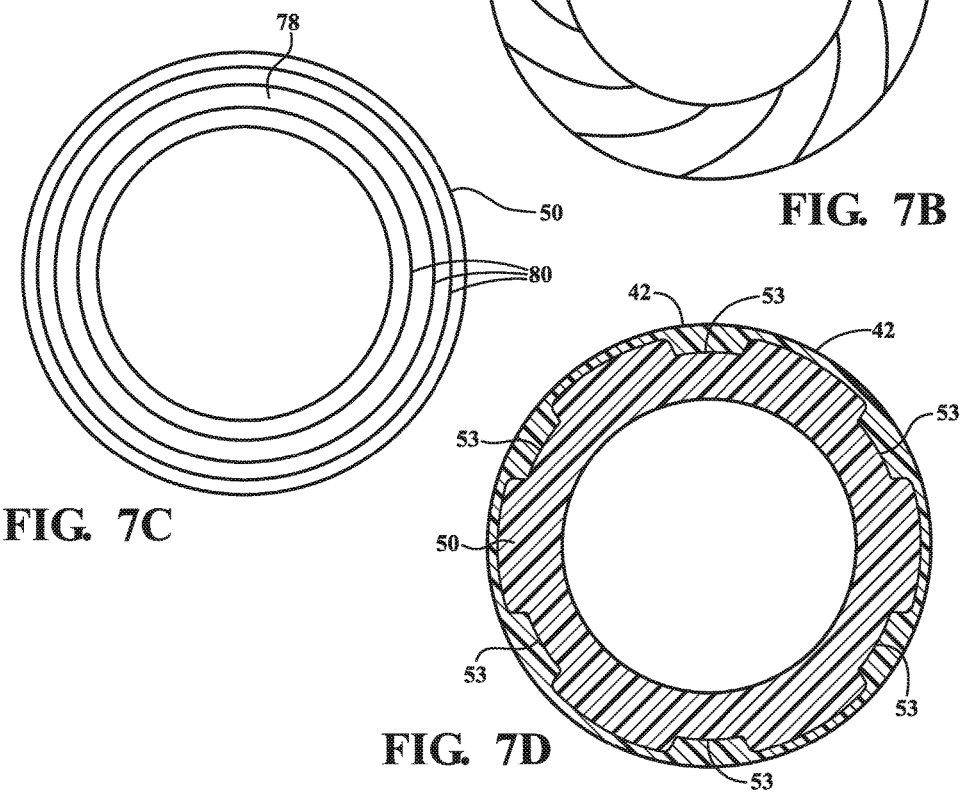
FIG. 7A
FIG. 7B
FIG. 7C
FIG. 7D

RADIAL SHAFT SEAL ASSEMBLY WITH AXIALLY ADAPTIVE DEBRIS EXCLUSION FACE LIP AND OIL SEAL FACE LIP

BACKGROUND OF THE INVENTION

1. Technical Field

This invention relates generally to dynamic radial shaft seals, and more particularly to a dynamic radial shaft seal having axially oppositely facing dust exclusion and oil seal face lips.

2. Related Art

Dynamic radial shaft face seals are known to include an annular outer seal component and an annular inner seal component. The outer seal component is configured to be mounted in a housing about an opening to be sealed and the inner seal component, including a wear sleeve, is configured to be mounted on a shaft extending through the opening for co-rotation therewith. The outer seal component typically includes an outer metal case having a metal cylindrical portion sized for press fit into the housing with a leg extending radially inwardly from the cylindrical portion. Further, an elastomeric body is typically attached to the leg, with a main oil seal lip extending radially inwardly into sealed abutment with the wear sleeve. Further, a dust exclusion lip can extend radially inwardly into sealed abutment with the wear sleeve to prevent dust and other contamination from reaching the main oil seal lip. The main oil seal lip and the dust exclusion lip are typically fixed axially in relation to the outer metal case and leg thereof, thereby providing little relative axial play or motion between the two lips and the outer metal case. Accordingly, proper assembly of the seal assembly requires locating the outer seal component into the housing in precise radial alignment with and in a precise axial position relative to the inner seal component fixed on the shaft to ensure the main oil seal lip and dust exclusion lip are brought into their proper respective engagements with their respective sealing surfaces. Otherwise, if the outer seal component is axially misaligned with the inner seal component, one of the main oil seal lip and dust exclusion lip will be brought into excessive interference with its respective sealing surface, thereby resulting in excessive friction, drag, and wear.

SUMMARY OF THE INVENTION

In accordance with one aspect of the invention, a radial shaft seal assembly is provided. The radial shaft seal assembly includes an inner wear sleeve having a cylindrical inner wall with a bore sized for tight receipt of a shaft therethrough and an exposed cylindrical outer surface. The inner wear sleeve further includes an oil side flange and an air side flange extending radially outwardly from the inner wall in axially spaced relation from one another. The assembly further includes an outer case having cylindrical outer wall configured for receipt in a housing. An elastomeric body is fixed to the outer case. The elastomeric body includes an annular serpentine portion extending radially inwardly from the outer wall to a radially innermost end. Further, a main seal lip extends from the innermost end of the annular serpentine portion into sealed contact with the oil side flange. Further yet, a dust lip extends from the innermost end of the annular serpentine portion into sealed contact with the air side flange.

In accordance with another aspect of the invention, the main seal lip can remain spaced radially outwardly, in its entirety, from the exposed cylindrical outer surface.

In accordance with another aspect of the invention, the main seal lip can diverge radially outwardly from the innermost end to form an oil slinger to throw oil back toward an oil side of the assembly.

In accordance with another aspect of the invention, the dust lip and the main seal lip extend in opposite axial directions from the innermost end of the serpentine portion.

In accordance with another aspect of the invention, the dust lip can be formed of rigid plastic, as a separated piece of material from the elastomeric body, to minimize the running friction between the dust lip and the air side flange.

In accordance with another aspect of the invention, the dust lip can have a radially extending annular face in abutment with the air side flange, wherein the annular face can have at least one pumping member configured to pump debris axially away from the main seal lip toward an air side of the seal assembly.

In accordance with another aspect of the invention, the main seal lip can be formed as a monolithic piece of the same material with the elastomeric body.

In accordance with another aspect of the invention, the inner wear sleeve can have a radially outer member forming one of the oil side flange and the air side flange and a separate radially inner member forming the other of the oil side flange and the air side flange, wherein the radially outer member and the radially inner member can be press fit into fixed relation with one another.

In accordance with another aspect of the invention, the radially inner member of the wear sleeve can provide the bore sized for a tight fit on the shaft.

In accordance with another aspect of the invention, the radially inner member can provide the exposed cylindrical outer surface of the wear sleeve.

In accordance with another aspect of the invention, the radially outer member can provide the exposed cylindrical outer surface of the wear sleeve.

In accordance with another aspect of the invention, the oil side flange can extend radially outwardly to a frustroconical free edge diverging toward an oil side of the seal assembly to facilitate inhibiting the egress of oil outwardly from the seal assembly.

In accordance with another aspect of the invention, the air side flange can extend radially outwardly to a serpentine end region meandering toward an air side of the seal assembly to inhibit the ingress of debris into the seal assembly.

In accordance with another aspect of the invention, the serpentine end region of the air side flange can include a cylindrical inner portion and a cylindrical outer portion with an intermediate portion extending radially between the cylindrical inner and outer portions.

In accordance with another aspect of the invention, the outer case can have a radially inwardly extending annular lip, wherein the annular serpentine portion of the elastomeric body extends radially inwardly directly from the annular lip in radial alignment therewith.

In accordance with another aspect of the invention, at least a portion of the annular serpentine portion can extend axially outwardly from the annular lip of the outer case toward the oil side flange.

In accordance with another aspect of the invention, the dust lip can be radially aligned with the annular lip of the outer case.

In accordance with another aspect of the invention, the radial shaft seal assembly can include an annular, gas permeable filter member disposed adjacent the at least one vent opening to inhibit dirt, dust, debris, and other forms of contamination from reaching and passing through the at least one vent opening.

In accordance with another aspect of the invention, the air side flange can be configured to extend between the dust lip and the filter member, with the filter member being on an air side of the air side flange.

In accordance with another aspect of the invention, the radial shaft seal assembly can include a secondary seal lip extending from the serpentine portion of the elastomeric body toward an air side of the assembly to further inhibit the ingress of contamination to the oil side of the assembly.

In accordance with another aspect of the invention, the secondary seal lip can be configured to extend into sealed contact with the air side flange to provide an even further enhance barrier to the ingress of contamination to the oil side of the assembly.

In accordance with another aspect of the invention, the secondary seal lip can be configured so that it remains slightly spaced in its entirety from the air side flange to minimize wear, drag and friction during use.

In accordance with another aspect of the invention, the radial shaft seal assembly can include an annular filter member disposed adjacent the secondary seal lip in axially spaced relation therefrom to inhibit contamination from reaching the secondary seal lip, and thus, further reducing the chances for the ingress of contamination to the oil side of the assembly.

Accordingly, the assembly provides an ability to axially misalign an outer seal component with an inner seal component during assembly without jeopardizing the ability to form a reliable seal between the main seal lip and the oil side flange, nor between the dust lip and the air side flange, while at the same time providing the assembly with a radially compact sealing solution, while also providing a robust assembly that results in low friction in use, is economical in manufacture and in use, and exhibits a long and useful life.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIGS. 7A-7C are plan views of a dust lip constructed in accordance with various aspects of the invention; and FIG. 7D is a cross-sectional view taken generally along the line 7D-7D of FIG. 1.

DETAILED DESCRIPTION OF PRESENTLY PREFERRED EMBODIMENTS

Figure 1:
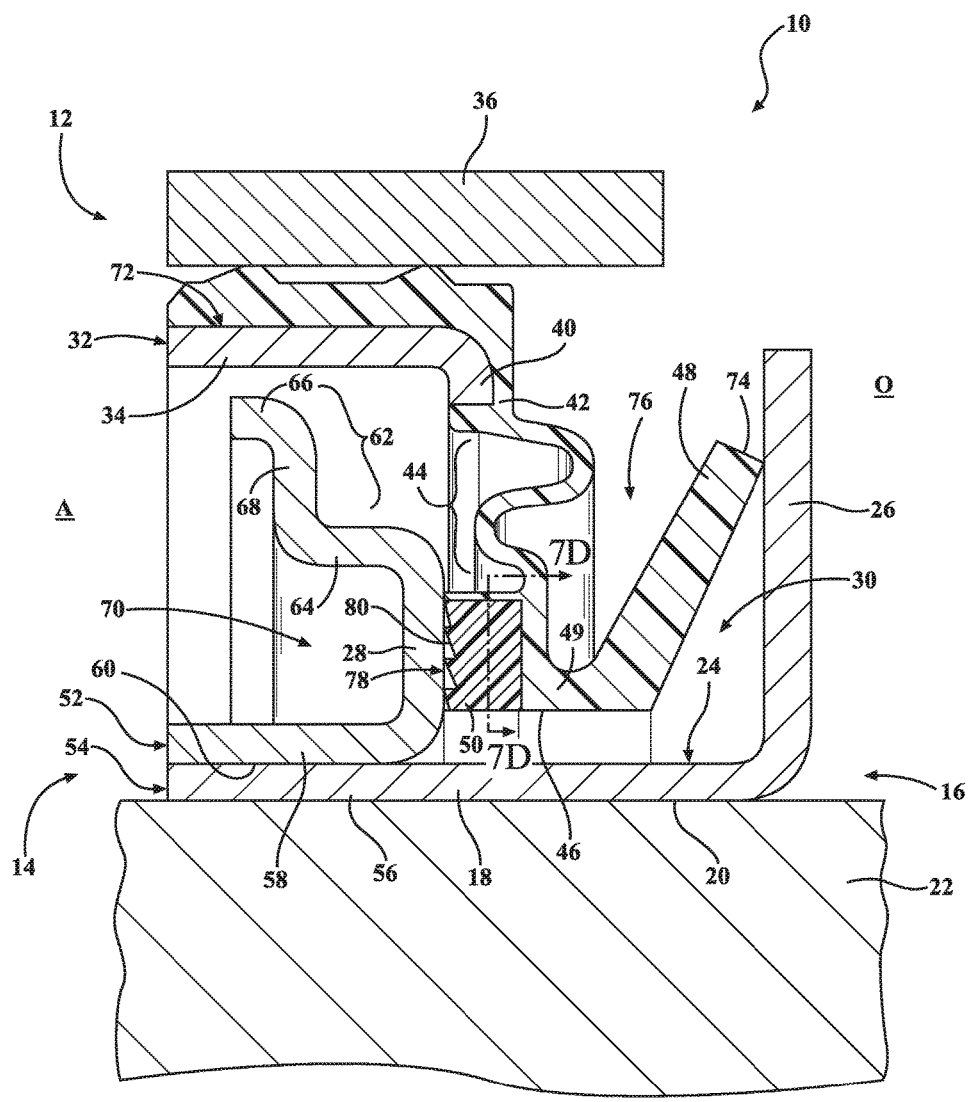
FIG. 1 is cross-sectional side view taken generally along a central axis of a radial shaft seal assembly constructed in accordance with one aspect of the invention.
Figure 2:
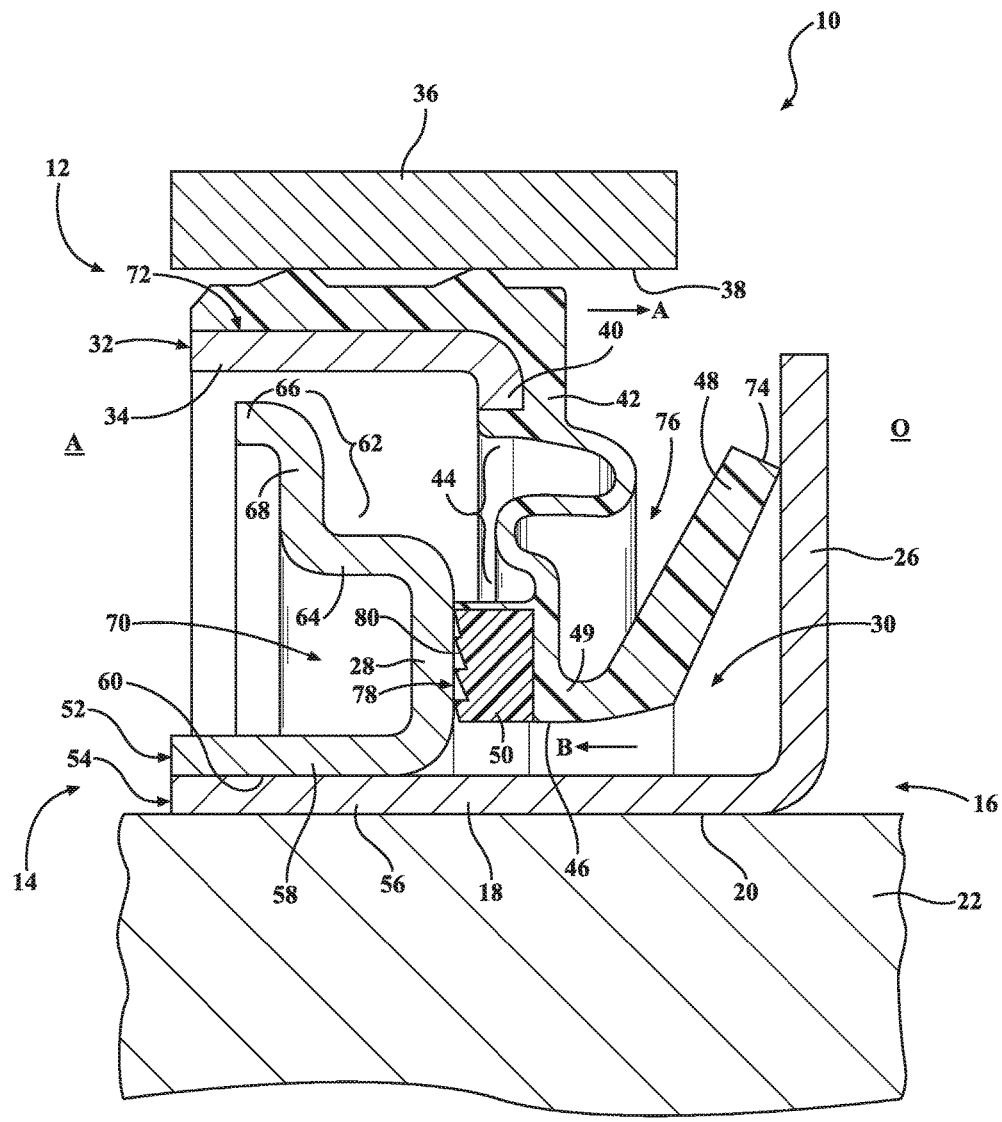
FIG. 2 is a view similar to FIG. 1 with an outer seal component of the radial shaft seal assembly shown axially shifted toward an oil side of the assembly relative to an inner seal component of the radial shaft seal assembly.
Figure 3:
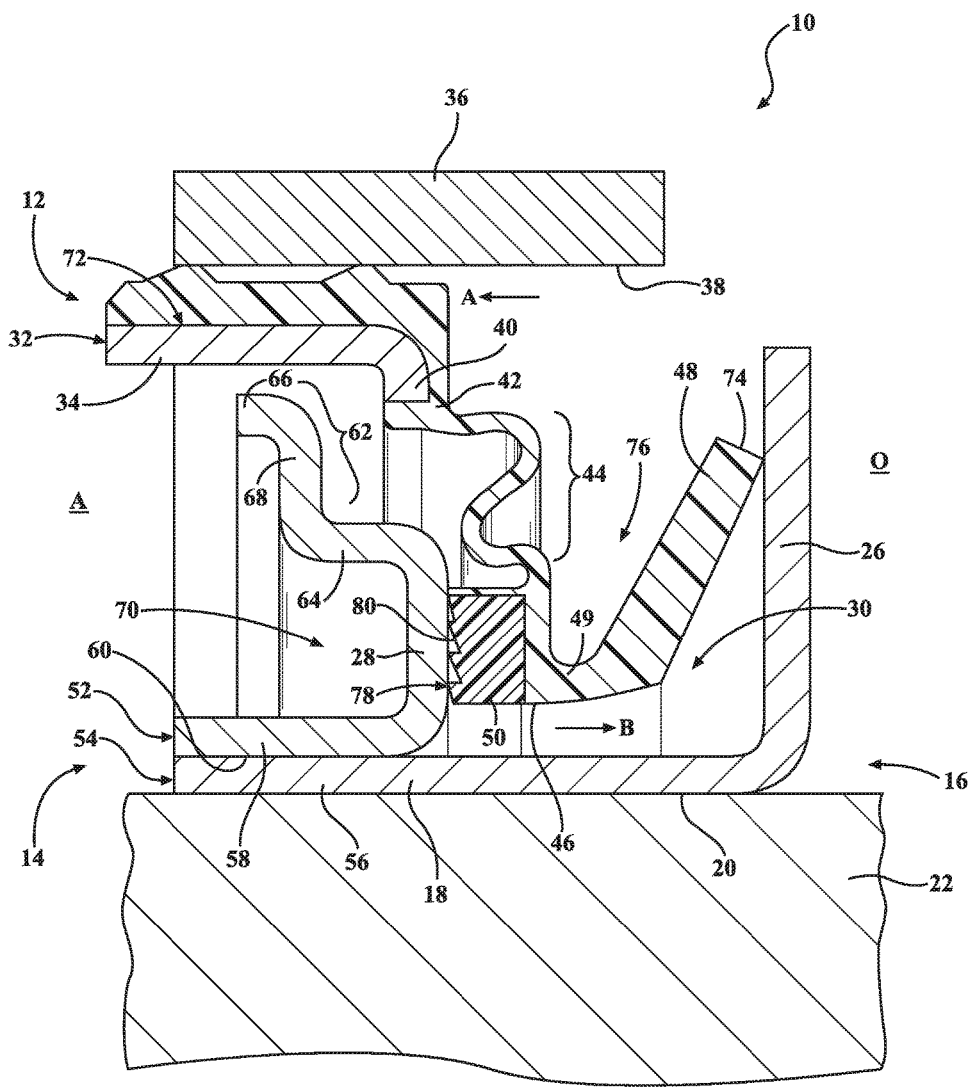
FIG. 3 is a view similar to FIG. 1 with an outer seal component of the radial shaft seal assembly shown axially shifted toward an air side of the assembly relative to an inner seal component of the radial shaft seal assembly.

Referring in more detail to the drawings, FIG. 1 illustrates a dynamic radial shaft seal assembly, referred to hereafter as assembly 10, constructed in accordance with one aspect of the invention. The assembly 10 maintains lubricant, e.g. oil, on an oil side O of the assembly, thereby inhibiting the egress of lubricant outwardly from the assembly 10, while preventing dust and other forms of contamination on an air side A of the assembly from entering the oil side O, thereby inhibiting the ingress of contamination into the assembly 10. The assembly 10 includes an annular outer seal component 12 and an annular inner seal component 14. The inner seal component 14 includes an inner wear sleeve 16 having a cylindrical wall 18 including a bore 20 sized for close receipt about a shaft 22 and an exposed cylindrical outer surface 24. Further, the wear sleeve 16 has an oil side flange 26 and an air side flange 28 extending radially outwardly from the cylindrical inner wall 18 in axially spaced relation from one another, thereby forming an annular channel 30 therebetween. The outer seal component 12 includes an annular outer carrier, also referred to as outer case 32, made of a rigid material, such as metal (e.g., steel), for example. The outer case 32 has a generally cylindrical outer wall 34 configured for fixed receipt in a housing 36, such as via press-fit or other mounting mechanism, in a bore 38 of the housing 36. The outer case 32 further has an annular flange, also referred to as rim, leg or lip 40, extending radially inwardly from the cylindrical outer wall 34. An elastomeric body 42 is fixedly attached to the outer case 32, and is shown as being fixed, at least in part, to the lip 40, such as by being molded or adhered directly thereto, for example. The elastomeric body 42 includes a highly flexible, annular serpentine portion 44 extending radially inwardly from the outer wall 34 of the outer case 32 to a radially innermost end 46. A main oil seal face lip, referred to hereafter simply as main seal lip 48, extends from the innermost end 46 into sealed contact with the oil side flange 26 of the wear sleeve 16 and a dust/debris/contamination exclusion face lip or seal, referred to hereafter simply as dust lip 50, extends from the innermost end 46 into sealed contact with the air side flange 28 of the wear sleeve 16. With the serpentine portion 44 being highly flexible, in both a radial and axial direction, the outer seal component 12 and inner seal component 14 can be inadvertently axially misaligned relative to one another during assembly while maintaining a reliable seal between the main seal lip 48 and the oil side flange 26, while also maintaining a reliable seal between the dust lip 50 and the air side flange 28. This is brought about primarily by the axial flexibility of the serpentine portion 44, which in turn provides the ability of the seal lip 48 and dust lip 50 to adapt and shift freely in opposite axial directions (see FIGS. 2 and 3 illustrating opposite axial direction shifting between the inner and outer seal components 12, 14), thereby maintaining the seal lip 48 and dust lip 50 properly positioned within the channel 30 formed between the oil and air side flanges 26, 28.

The inner wear sleeve 16, by way of example and without limitation, is shown having a radially outer member 52 forming one of the oil side and air side flanges 26, 28, and shown as the air side flange 28, by way of example and without limitation, and a radially inner member 54 forming the other of the oil side and air side flanges 26, 28, and shown as the oil side flange 26, by way of example and without limitation. The radially inner member 54 has an inner cylindrical wall 56, shown as forming the bore 20 sized for fixation on the shaft 22 and providing the exposed cylindrical outer surface 24, with the oil side flange 26 formed as a single piece of material therewith and extending radially outwardly therefrom, shown as providing the inner member 54 with a generally L-shaped cross-section. The radially outer member 52 has an outer cylindrical wall 58, shown as forming a bore 60 sized for fixation, such as via a press fit, on the outer surface 24 of the cylindrical wall 56 of the inner member 54, with the air side flange 28 formed as a single piece of material therewith and extending radially outwardly therefrom. The air side flange 28 can be shaped having a serpentine end region 62 meandering toward the air side A of the seal assembly 10. The serpentine end region 62 is shown having a cylindrical inner portion 64 and a cylindrical outer portion 66 with an intermediate portion 68 extending radially between the cylindrical inner and outer portions 64, 66. The serpentine configuration can be configured as desired to optimally act as a barrier and slinger to environmental debris/contamination. Further, the serpentine end region 62 is reversed in overlapping relation with the cylindrical wall 58, thereby forming an annular pocket or channel 70 beneath the serpentine end region 62, which in turn acts to prevent debris/contamination from reaching the dust lip 50. The respective outer and inner members 52, 54 can be press fit with one another to fix the oil side and air side flanges 26, 28 relative to one another, thereby defining the desired axial length of the annular channel 30 therebetween. The size of the channel 30 is selected to provide the desired fit of the seal lip 48 and dust lip 50 therein, thereby resulting in a predetermined range of dynamic friction between the lips 48, 50 and their respective running surfaces on the flanges 26, 28.

The elastomeric body 42, including the serpentine portion 44 and main seal lip 48, can be formed as a single piece of elastomeric material, including any desired seal grade rubber or the like, such as in a single insert molding operation with the outer case 32, by way of example and without limitation. It should be recognize that the elastomeric body 42 could be formed separately from the outer case 32 and then subsequently bonded thereto, if desired. The elastomeric body 42 can be formed to extend over at least a portion or the entirety of an outer surface 72 of the outer wall 34 of the outer case 32 to facilitate forming a tight, dampened interference fit of the outer case 32 within the bore 38 of the housing 36. The elastomeric body 42 is shown as being bonded to at least a portion of the annular lip 40 of the outer case 32, shown as being bonded to an outer surface and free end of the lip 40, with the serpentine portion 44 extending radially inwardly from the lip 40 in radial alignment or substantial radial alignment therewith. The serpentine portion 44 is shown as having at least a portion that extends axially outwardly beyond the annular lip 40 toward the oil side flange 26 in radially overlying relation with the channel 30. The main seal lip 48, formed as an extension of the elastomeric body 42, diverges radially outwardly from a reduced thickness hinge 49 (relative to the thickness of the main seal lip portion attached to the hinge 49, with the hinge 49 enhancing flexibility of the lip 48 and reducing friction between the lip 48 and the oil side flange 26) immediately adjacent the innermost end 46 to a free end 74 configured for sealing contact with the oil side flange 26. The diverging configuration of the main seal lip 48 forms a frustroconical shape, with an annular channel 76 being formed between the main seal lip 48 and the serpentine portion 44. The annular channel 76 opens radially outwardly and acts to catch lubrication in trough-like fashion to inhibit the egress of the lubrication from the oil side O. Further, with the main seal lip 48 diverging radially outwardly, the main seal lip 48, and the inmost end 46 of the serpentine portion 44, remain spaced radially outwardly from the outer surface 57 of the wear sleeve 16 in their entirety, and thus, the only friction generated by the main seal lip 48 occurs between the free end 74 and the oil side flange 26.

The dust lip 50 can be formed from a separate piece of material, such as from a comparatively rigid material from the elastomeric body 42, e.g., rigid or substantially rigid, low friction plastic, and then be subsequently fixed thereto, such as via any suitable adhesive or insert molding process, by way of example and without limitation. To facilitate bonding or otherwise fixing the dust lip 50 to the elastomeric body 42, one or more scallops, recesses or other surface irregularities 53 can be formed in an outer surface of the dust lip 50 (FIG. 7D), thereby providing increased surface area for the elastomeric material of the elastomeric body 42 to bond therewith, and further providing resistance against relative rotation therebetween. The dust lip 50 extends from an opposite side of the innermost end 46 of the elastomeric body 42 from the main seal lip 48, such that the dust lip 50 and main seal lip 48 extend in opposite axial directions from one another and from the innermost end 46. The dust lip 50 has a radially extending, axially facing annular face 78 brought into abutment with the air side flange 28. The annular face 78 can be formed having at least one or a plurality of pumping members 80 configured (oriented) to pump contamination radially outwardly and axially away from the main seal lip 48 toward back toward the air side A of the seal assembly 10. The pumping member(s) 80 can take the form of a single helical/spiral inwardly extending groove, thread or outwardly extending flute, extending one or more times about the face 78, as shown in FIG. 7A; a plurality of helical grooves, threads or flutes spaced circumferentially from one another such that each groove, thread or flute extends less than completely about the face 78, as shown in FIG. 7B; or one or more annular grooves, threads or flutes, shown as a plurality of concentric grooves, threads or flutes in FIG. 7C. The dust lip 50 remains spaced in its entirety from the outer surface 24 of the wear sleeve 16, and thus, the only friction generated by the dust lip 50 occurs between the end face 78 and the air side flange 28.

In use, given the ability of the main seal lip 48 and dust lip 50 to shift axially as a result of the high flexible serpentine portion 44, the loading and friction generated between the 3 different scenarios depicted in FIGS. 1-3 remains substantially constant. As such, if inadvertent axial misalignment between the outer seal component 12 and inner seal component 14 results during assembly or while in use, shown as the outer seal component 12 shifting in the relative direction of arrow A and the inner seal component 14 shifting in the relative direction of arrow B (FIG. 2, showing the main seal lip 48 being moved axially toward the outer case 32; FIG. 3, showing main seal lip 48 being moved axially away from the outer case 32), the sealing performance and life expectancy of the seal assembly 10 is substantially unaffected. Accordingly, the seal assembly 10 is highly tolerant of axial shifting between the shaft 22 and inner seal component 14 thereon and the housing 36 and the outer seal component 12 therein.

Figure 4:
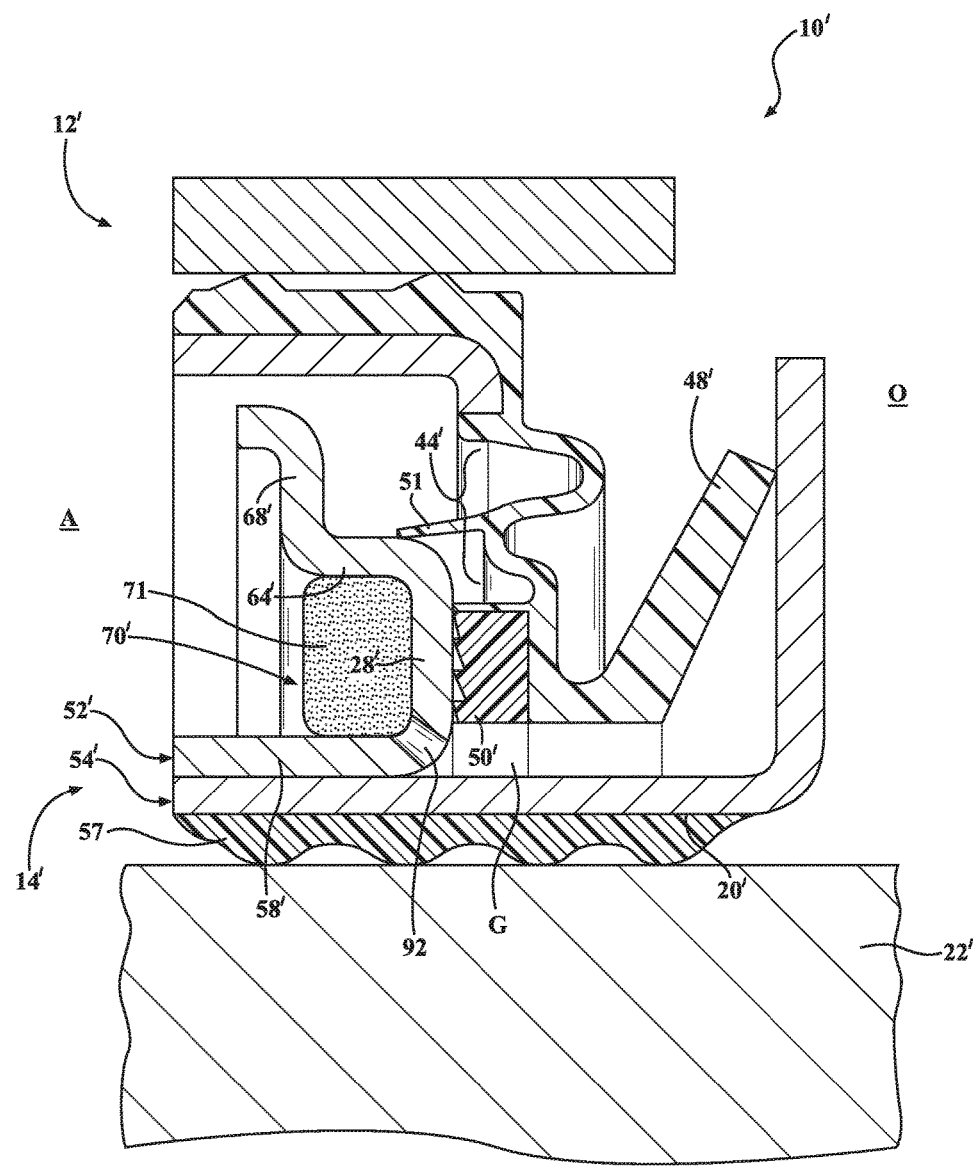
FIG. 4 is a view similar to FIG. 1 of a radial shaft seal assembly constructed in accordance with another aspect of the invention.

In FIG. 4, a seal assembly 10' constructed in accordance with another aspect of the invention is shown, wherein the same reference numerals as used above, offset by a prime factor ('), are used to identify similar features.

The seal assembly 10' is similar to the previously discussed seal assembly 10, and thus, the discussion hereafter is intended to focus on the notable differences, with some common features discussed as well for clarity. The seal assembly 10' includes an annular outer seal component 12' and an annular inner seal component 14'. The inner seal component 14' includes a radially outer member 52' and a radially inner member 54', as substantially discussed above; however, the radially outer member 52 includes at least one vent opening 92 or a plurality of circumferentially spaced vent openings 92 extending therethrough. The vent openings 92 are shown as being formed through a portion of an air side flange 28' such that the vent openings 92 open into an annular gap G formed radially inwardly beneath the dust lip 50'. The vent openings 92 prevent a vacuum or negative pressure from forming between the dust lip 50' and a main seal lip 48', and thus, the dust lip 50' and main seal lip 48 are able to maintain their properly sealed orientation relative to their respective sealing surfaces. In addition, to prevent unwanted contamination and debris from freely passing through the vent openings 92, a filter member 71, such as an annular felt or other suitable micro-porous, gas permeable filter material, by way of example and without limitation, can be disposed and fixed within an annular, generally U-shaped channel 70', as viewed in axial cross-section, which is bounded by a cylindrical wall 58', cylindrical inner portion 64' and a radially extending portion of the air side flange 28'. The filter member 71 and the dust lip 50' are axially aligned with one another with the air side flange 28' extending therebetween. The filter member 71 has an air side face that is generally flush with the intermediate flange 68' such that the filter member 71 is received entirely within the annular channel 70' to minimize the axial envelop of the seal assembly 10'. The filter member 71 abuts and blocks off the air vent(s) 92 in its entirety, thereby assuring no debris reaches or passes therethrough. Of course, with the filter member being gas permeable, air/gas is free to pass through the filter member and vent opening(s).

The seal assembly 10' further includes a secondary seal lip 51 extending from a midsection of an annular serpentine portion 44'. The secondary seal lip 51 extends substantially axially toward the air side A away from the main seal lip 148', and is shown as extending into sealed contact with a radially outwardly facing surface of the cylindrical inner portion 64' of the air side flange, by way of example and without limitation. As such, a further barrier, in addition to the dust lip 50' and main seal lip 48', is provided to inhibit the ingress of dust and other types of contamination. The bore 20' of the inner member 54' is shown as having an elastomeric material 57, such as rubber, bonded thereto to facilitate assembly of the seal assembly 10' on the shaft 22. Other than those differences discussed above and shown in FIG. 4, the seal assembly 10' is the same as discussed above for the seal assembly 10, and thus, no further discussion is believed necessary, as one possessing ordinary skill in the art would readily appreciate their commonalties upon viewing the disclosure herein.

Figure 5:
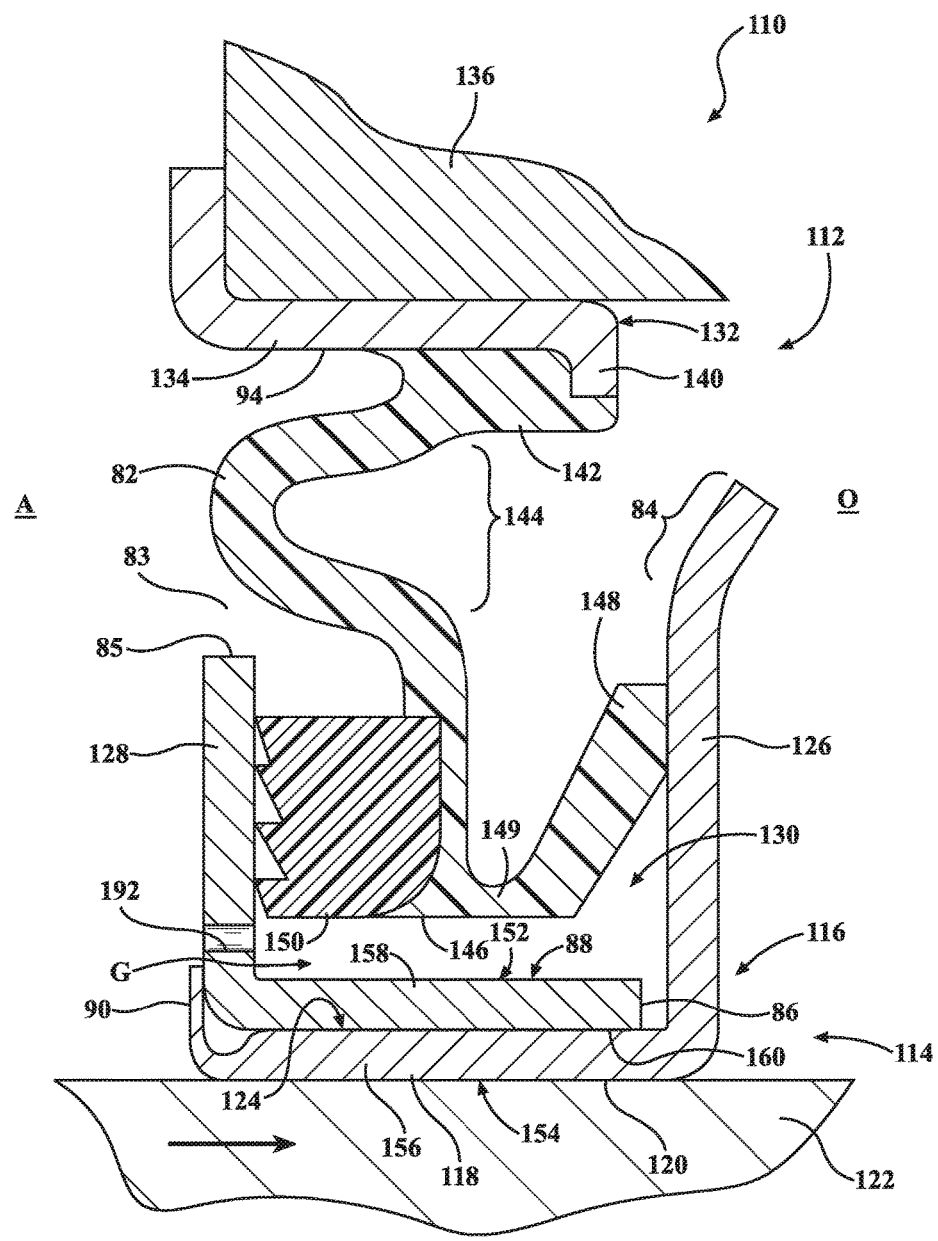
FIG. 5 is a view similar to FIG. 1 of a radial shaft seal assembly constructed in accordance with yet another aspect of the invention.

In FIG. 5, a seal assembly 110 constructed in accordance with another aspect of the invention is shown, wherein the same reference numerals as used above, offset by a factor of 100, are used to identify similar features.

The seal assembly 110 is similar to the previously discussed seal assembly 10, and thus, the discussion hereafter is intended to focus on the notable differences, with some common features discussed as well for clarity. The seal assembly 110 includes an annular outer seal component 112 and an annular inner seal component 114. The inner seal component 114 includes an inner wear sleeve 116 having a cylindrical inner wall 118 including a bore 120 sized for close receipt about a shaft 122 and an exposed cylindrical outer surface 124. Further, the wear sleeve 116 has an oil side flange 126 and an air side flange 128 in axially spaced relation from one another, thereby forming an annular channel 130 therebetween. The outer seal component 112 includes an annular outer case 132 having a generally cylindrical outer wall 134 configured for fixed receipt in a housing 136. The outer case 132 further has an annular lip 140 extending radially inwardly from the cylindrical outer wall 134. An elastomeric body 142 is fixed to the outer case 132, as discussed above. The elastomeric body 142 includes a highly flexible, annular serpentine portion 144 extending radially inwardly from the outer wall 134 of the outer case 132 to a radially innermost end 146. A main oil seal face lip 148 extends from an annular, reduced thickness hinge 149 immediately adjacent the innermost end 146 into face sealed contact with a face of the oil side flange 126 and a dust exclusion face lip 150 extends axially from the innermost end 146 into face sealed contact with a face of the air side flange 128. As discussed above, the highly flexible serpentine portion 144 allows the outer seal component 112 and inner seal component 114 to be inadvertently axially misaligned relative to one another during assembly or while in use, while maintaining a reliable low friction seal between the main seal lip 148 and the oil side flange 126, while also maintaining a reliable low friction seal between the dust lip 150 and the air side flange 128. The serpentine portion 144 is shown having a convolute 82 extending axially toward the air side A, with the convolute 82 shown extending into an annular window 83 formed between a free end 85 of the air side flange 128 and the cylindrical wall 134 of the outer case 132. As such, the convolute 82 acts as a barrier to debris and the like on the air side A, thereby inhibiting the debris from the reaching the dust lip 150, and thus, facilitating the prevention of the ingress of debris from the air side A to the oil side O.

The inner wear sleeve 116 is shown having a radially outer member 152 forming the air side flange 128, by way of example and without limitation, and a radially inner member 154 forming the oil side flange 126, by way of example and without limitation. The radially inner member 154 has a cylindrical wall 156, shown as forming the bore 120 sized for fixation on the shaft 122, with the oil side flange 126 extending radially outwardly therefrom and providing the inner member 154 with a generally L-shaped cross-section. The oil side flange 126 extends radially outwardly to a frustroconical free edge region 84 diverging toward the oil side O of the assembly 110. The frustroconical free edge region 84 acts as an oil slinger to pump oil toward the oil side O, thereby inhibiting the egress of the oil from the oil side O to the air side A.

The radially outer member 152 has a cylindrical wall 158, shown as forming a bore 160 sized for fixation, such as via a press fit, on the outer surface 124 of the inner member 154, with the air side flange 128 extending radially outwardly therefrom to form the outer member 152 as being generally L-shaped as viewed in cross-section. The respective outer and inner members 152, 154 can be press fit with one another to fix the oil side and air side flanges 126, 128 relative to one another to define the annular channel 130 therebetween. The cylindrical wall 158 of the outer member 152 extends to a free end 86, wherein the free end 86 is oriented to face the oil side flange 126, with the free end 86 being shown pressed into close or abutting relation with a face of the oil side flange 126. As such, this is opposite that shown in the previous seal assembly 10, such that an outer surface 88 of the cylindrical wall 158 of the outer member 152 extends axially beneath the serpentine portion 144 and at least a portion of the main seal lip 148. To facilitate retaining the outer member 152 in its relative fixed location with the inner member 154, an end lip 90 of the cylindrical wall 156 of the inner member 154 can be curled or folded radially outwardly in captured abutting relation with the air side flange 128. As such, the inner seal component 114 is generally U-shaped as viewed in axial cross-section. To facilitate venting and promoting air flow, while avoiding unwanted vacuum pressure, the air side flange 128 can be formed having one or more vent openings 192 extending therethrough, shown as being formed through a portion of the air side flange 128 such that the vent opening 192 opens into an annular gap G formed radially inwardly beneath the dust seal 150. It will be appreciated that the vent openings 192 can be provided in the number desired, and can be circumferentially spaced in equidistant relation from one another about the annular gap G.

The elastomeric body 142 can be bonded to at least a portion of the annular lip 140 of the outer case 32, shown as being bonded to a free end of the lip 40 and to an inner surface 94 of the cylindrical wall 134 of the outer case 132, with the serpentine portion 144 extending radially inwardly directly from the inner surface 94 in radial alignment or substantial radial alignment therewith. The serpentine portion 144 is shown as extending in its entirety or substantial entirety beneath the cylindrical wall 134 in radial alignment with the channel 130, and thus, the axial envelop of the seal assembly 110 is minimized, thereby allowing the seal assembly 110 to be utilized in a correspondingly small axial envelop application. The main seal lip 148 diverges radially outwardly from the innermost end 146 to a free end 174 configured for sealing contact with the oil side flange 126. An annular channel 176 is formed between the main seal lip 148 and the serpentine portion 144, with the annular channel 176 opening radially outwardly, as discussed above. The main seal lip 148 and dust lip 150 remain spaced radially outwardly from the outer surface 88 of the wear sleeve 116 in their entirety, and thus, the only friction generated by the main seal lip 148 and dust lip 150 occurs with their abutting the oil side flange 126 and air side flange 128, respectively.

Otherwise, the seal assembly 110 is the same or substantially the same as discussed above with regard to the seal assembly 10, and thus, further discussion is believed unnecessary as one possessing ordinary skill in the art would readily appreciate and understand their commonalties.

Figure 6:
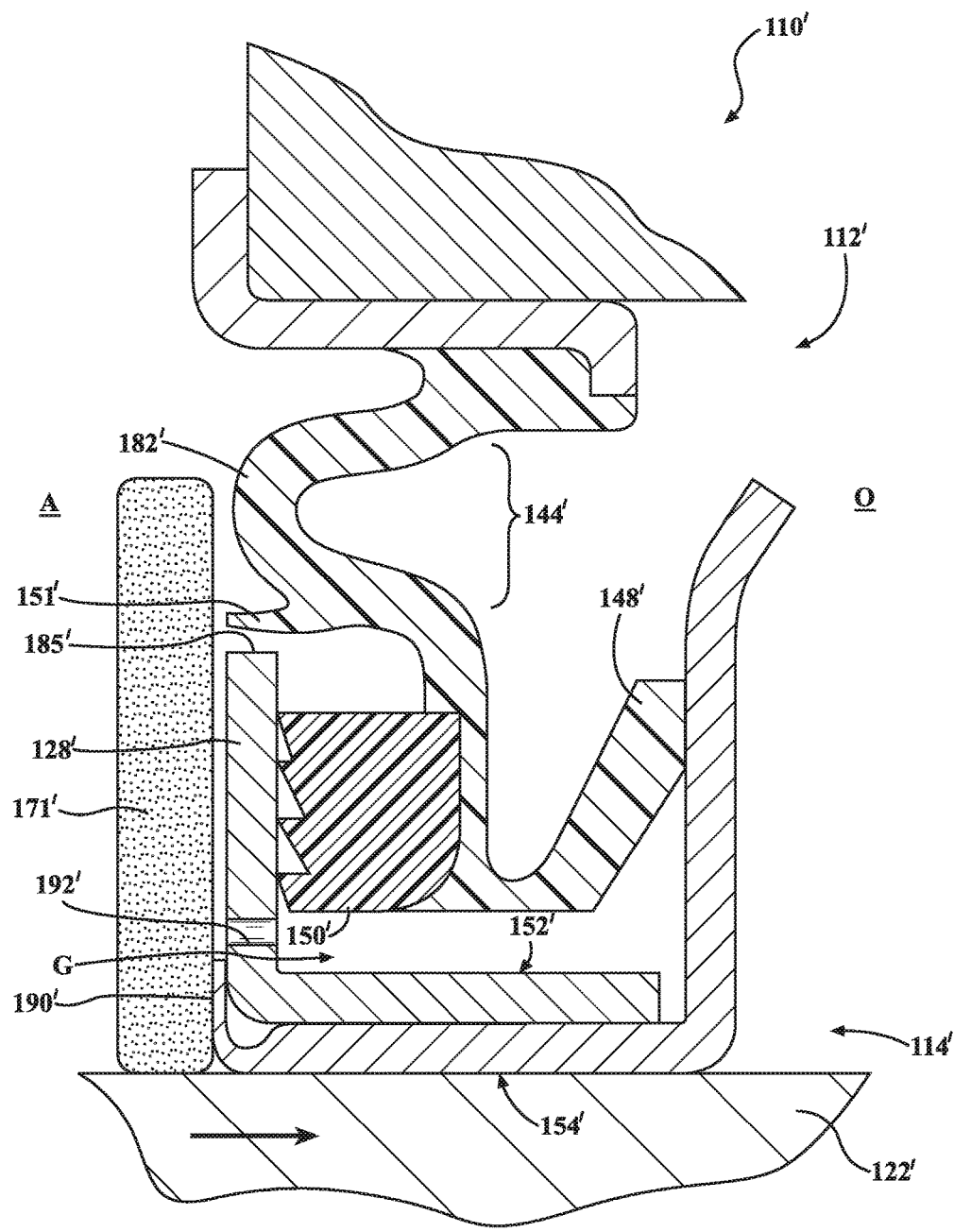
FIG. 6 is a view similar to FIG. 1 of a radial shaft seal assembly constructed in accordance with still yet another aspect of the invention.

In FIG. 6, a seal assembly 110' constructed in accordance with another aspect of the invention is shown, wherein the same reference numerals as used above with regard to the seal assembly 110, offset by a prime factor ('), are used to identify similar features.

The seal assembly 110' is similar to the previously discussed seal assembly 110, and thus, the discussion hereafter is intended to focus on the notable differences, with some common features discussed as well for clarity.

The seal assembly 110' includes an annular outer seal component 112' and an annular inner seal component 114'. The inner seal component 114' includes a radially outer member 152' and a radially inner member 154', as substantially discussed above, including at least one vent opening 192' or a plurality of circumferentially spaced vent openings 192' extending therethrough. The vent openings 192' are shown as being formed through a portion of an air side flange 128' such that the vent openings 192' open into an annular gap G formed radially inwardly beneath the dust lip 150'. The vent openings 192' prevent a vacuum or negative pressure from forming between the dust lip 150' and a main seal lip 148'. In addition, to prevent unwanted contamination and debris from freely passing through the vent openings 192', a filter member 171', such as an annular felt or other suitable micro-porous, gas permeable filter material, by way of example and without limitation, can be disposed and fixed about the shaft 122' adjacent the vent openings 192', shown as being sized for a close or slight interference fit on the shaft 122' and further shown as abutting an end lip 190' of the inner member 154'. The filter member 171' is shown as being generally disc-shaped, by way of example and without limitation, extending radially outwardly from the shaft 122' and radially beyond a free end 185' of an air side flange 128' into axial alignment with a convolute 182' of the serpentine portion 144' and in axially spaced relation from the serpentine portion 144'. As such, with the air side flange 128' extending between the filter member 171' and dust lip 150', the filter member 171' substantially shields the vent opening(s) 192' and forms a barrier to the ingress of dust and debris between the convolute 182' and the free end 185' of an air side flange 128'. It should be recognized that though the filter member 171' is shown as being slightly spaced from the vent opening(s) 192', it could be deformed or otherwise be brought into direct abutment therewith given the filter member 192' is gas permeable. To further inhibit the ingress of contamination, the seal assembly 110' further includes a secondary seal lip 151', shown as extending substantially axially from the convolute 182' toward the air side A, by way of example and without limitation, and is shown as extending into close, but slightly spaced relation with an axially facing surface of the filter member 171', and is further shown as being spaced in its entirety from the air side flange 128', thereby resulting in no friction against the filter member 171' or the air side flange 128'. The secondary seal lip 151' is shown as being spaced in radial alignment from the air side flange 128', and terminating in flush radial alignment therewith, though, it is to be recognized that the secondary lip 151' could be formed to extend radially, such as into close relation or abutment with the air side flange 128' to form a contact seal thereagainst, if desired. As such, a yet further barrier, in addition to the dust lip 150', main seal lip 48', and filter member 171', is provided to inhibit the ingress of dust and other types of contamination. Other than those differences discussed above and shown in FIG. 6, the seal assembly 110' is the same as discussed above for the seal assembly 110, and thus, no further discussion is believed necessary, as one possessing ordinary skill in the art would readily appreciate their commonalties upon viewing the disclosure herein.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:
1. A radial shaft seal assembly, comprising:
   an inner wear sleeve having a cylindrical inner wall with a bore sized for close receipt of a shaft therethrough and an exposed cylindrical outer surface, said inner wear sleeve having an oil side flange and an air side flange extending radially outwardly from said cylindrical inner wall in axially spaced relation from one another;

an outer case having cylindrical outer wall configured for receipt in a housing;
an elastomeric body fixed to said outer case, said elastomeric body including an annular serpentine portion extending radially inwardly from said outer wall to a radially innermost end;
a main seal lip extending from said innermost end of said annular serpentine portion into sealed contact with said oil side flange; and
a dust lip fixed to said annular serpentine portion and extending into sealed contact with said air side flange.

2. The radial shaft seal assembly of claim 1 wherein said main seal lip remains spaced radially outwardly from said exposed cylindrical outer surface in its entirety.

3. The radial shaft seal assembly of claim 1 wherein said main seal lip diverges radially outwardly from said innermost end.

4. The radial shaft seal assembly of claim 1 wherein said dust lip and said main seal lip extend in opposite axial directions from said innermost end.

5. The radial shaft seal assembly of claim 1 wherein said dust lip is plastic.

6. The radial shaft seal assembly of claim 1 wherein said dust lip has a radially extending annular face in abutment with said air side flange, said annular face having at least one pumping member configured to pump debris radially outwardly and axially away from said main seal lip toward an air side of the seal assembly.

7. The radial shaft seal assembly of claim 1 wherein said main seal lip is formed as a monolithic piece of the same material with said elastomeric body.

8. The radial shaft seal assembly of claim 1 wherein said inner wear sleeve has a radially outer member forming one of said oil side flange and said air side flange and a radially inner member forming the other of said oil side flange and said air side flange, said radially outer member and said radially inner member being press fit into fixed relation with one another.

9. The radial shaft seal assembly of claim 8 wherein said radially inner member forms said bore.

10. The radial shaft seal assembly of claim 9 wherein said radially inner member forms said exposed cylindrical outer surface.

11. The radial shaft seal assembly of claim 9 wherein said radially outer member forms said exposed cylindrical outer surface.

12. The radial shaft seal assembly of claim 1 wherein said oil side flange extends radially outwardly to a frustroconical free edge diverging toward an oil side of the seal assembly.

13. The radial shaft seal assembly of claim 1 wherein said air side flange extends radially outwardly to a serpentine end region meandering toward an air side of the seal assembly.

14. The radial shaft seal assembly of claim 13 wherein said serpentine end region includes a cylindrical inner portion and a cylindrical outer portion with an intermediate portion extending radially between said cylindrical inner and outer portions.

15. The radial shaft seal assembly of claim 1 wherein said outer case has a radially inwardly extending annular lip, said annular serpentine portion extends radially inwardly from said annular lip in radial alignment therewith.

16. The radial shaft seal assembly of claim 15 wherein at least a portion of said annular serpentine portion extends axially outwardly from said annular lip toward said oil side flange.

17. The radial shaft seal assembly of claim 15 wherein said dust lip is radially aligned with said annular lip.

18. The radial shaft seal assembly of claim 1 wherein said outer case has a cylindrical inner surface, said annular serpentine portion extends radially inwardly from said cylindrical inner surface in radial alignment therewith.

19. The radial shaft seal assembly of claim 1 wherein said air side flange has at least one vent opening extending therethrough.

20. The radial shaft seal assembly of claim 19 wherein said at least one vent opening extends into an annular gap radially inwardly from said dust lip.

21. The radial shaft seal assembly of claim 19 further including an annular filter member disposed adjacent said at least one vent opening.

22. The radial shaft seal assembly of claim 21 wherein said air side flange extends between said dust lip and said filter member.

23. The radial shaft seal assembly of claim 1 further including a secondary seal lip extending from said serpentine portion toward an air side of the assembly.

24. The radial shaft seal assembly of claim 23 wherein the secondary seal lip extends into sealed contact with said air side flange.

25. The radial shaft seal assembly of claim 23 wherein the secondary seal lip is spaced in its entirety from said air side flange.

26. The radial shaft seal assembly of claim 25 further including an annular filter member disposed adjacent said secondary seal lip in axially spaced relation therefrom.

27. The radial shaft seal assembly of claim 26 wherein said annular filter member is axially aligned with said serpentine portion in axially spaced relation therefrom.

28. The radial shaft seal assembly of claim 1 wherein said annular serpentine portion is flexible in axial and radial directions.

* * * * *